United States Patent
Landskron et al.

(10) Patent No.: US 9,623,768 B2
(45) Date of Patent: Apr. 18, 2017

(54) HOLDING DEVICE FOR AN ADJUSTMENT DRIVE OF A MOTOR VEHICLE SEAT

(75) Inventors: Robert Landskron, Monheim (DE); Thorsten Schürmann, Odenthal (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 190 days.

(21) Appl. No.: 14/233,733

(22) PCT Filed: Jul. 5, 2012

(86) PCT No.: PCT/EP2012/063150
§ 371 (c)(1),
(2), (4) Date: Apr. 21, 2014

(87) PCT Pub. No.: WO2013/013951
PCT Pub. Date: Jan. 31, 2013

(65) Prior Publication Data
US 2014/0263891 A1    Sep. 18, 2014

(30) Foreign Application Priority Data
Jul. 22, 2011  (DE) .................. 10 2011 052 058

(51) Int. Cl.
*B60N 2/07* (2006.01)
*B60N 2/02* (2006.01)
(Continued)

(52) U.S. Cl.
CPC ......... *B60N 2/0722* (2013.01); *B60N 2/0232* (2013.01); *B60N 2/067* (2013.01); *F16M 13/02* (2013.01); *B60N 2002/024* (2013.01)

(58) Field of Classification Search
CPC ...... B60N 2/07; B60N 2/0722; B60N 2/0715; B60N 2/0705; B60N 2/0818; B60N 2002/024; F16M 13/02
(Continued)

(56) References Cited

U.S. PATENT DOCUMENTS 6,688,667 B2    2/2004    Nishimoto et al.
7,669,824 B2 *  3/2010    Woehrle ................ B60N 2/067
                                                                248/419
(Continued)

FOREIGN PATENT DOCUMENTS

CN    1458008 A    11/2003
DE    21 00 676 A1    9/1972
(Continued)

OTHER PUBLICATIONS

International Preliminary Report on Patentability and Translation of Written Opinion for International Application No. PCT/EP2012/063150 dated Jan. 28, 2014.
(Continued)

*Primary Examiner* — Nkeisha Smith
(74) *Attorney, Agent, or Firm* — Foley & Lardner LLP

(57) ABSTRACT

A holding device for an adjustment drive of a motor vehicle seat, having at least one connection flange formed from plastic material for fastening the holding device to the vehicle seat. A fastening clip having at least one holding clip, which can be adjusted between a locking position and an assembly position in an elastic manner, is formed on the connection flange on one side and a locking element is removably formed in a rest position on the other side. The locking element can be manually relocated through an opening in the connection flange from the rest position to a locked position in which the locking element blocks an elastic relocation of the holding clip into the assembly position.

12 Claims, 6 Drawing Sheets

Figure 1:
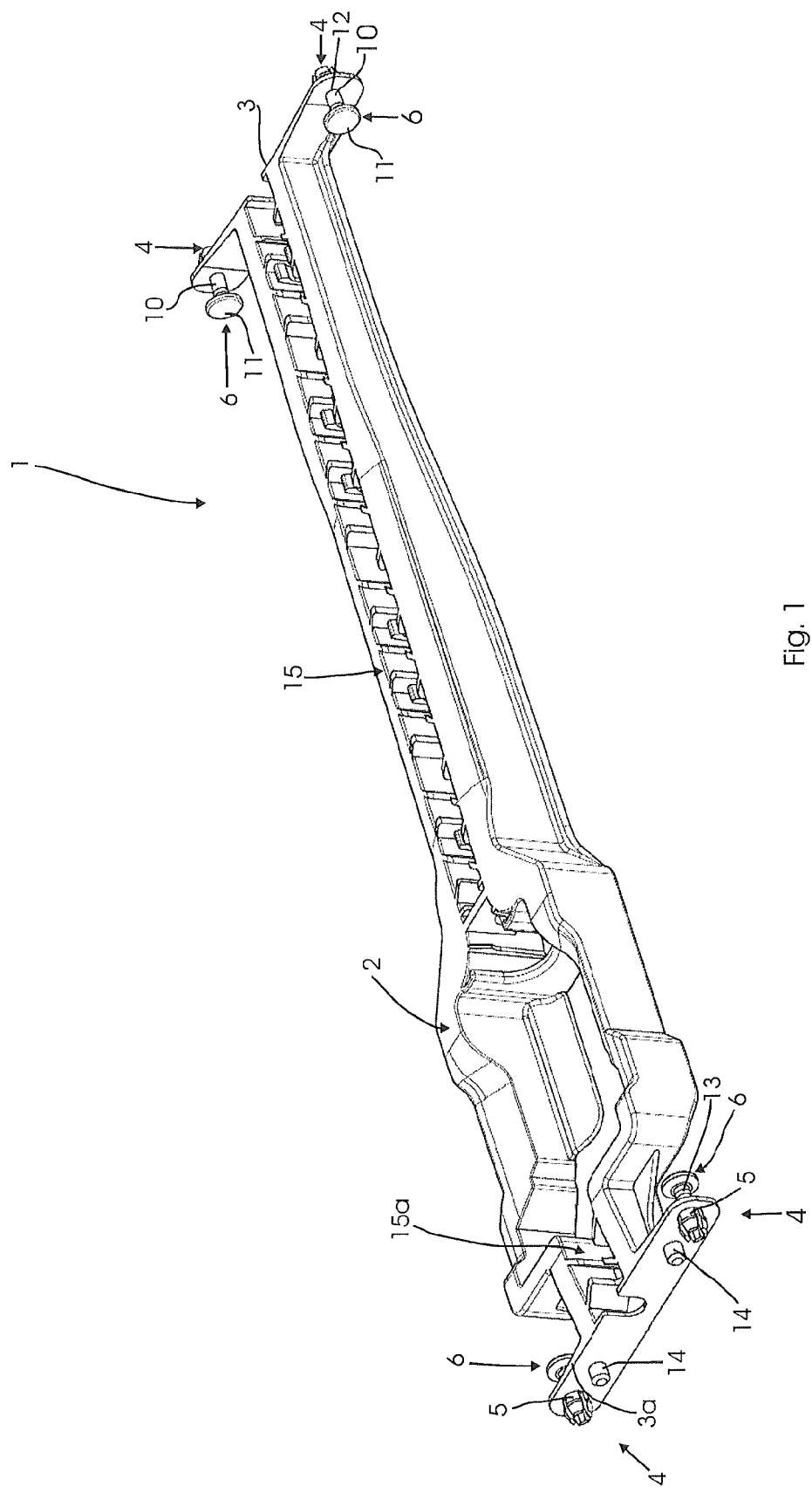

(51) Int. Cl.
B60N 2/06 (2006.01)
F16M 13/02 (2006.01)

(58) Field of Classification Search
USPC ............... 248/424, 429, 430, 425, 205.1; 297/344.1
See application file for complete search history.

(56) References Cited

U.S. PATENT DOCUMENTS

| | | | | |
|---|---|---|---|---|
| 8,128,051 B2* | 3/2012 | Koga | ............... | B60N 2/0232 248/429 |
| 8,226,063 B2* | 7/2012 | Weber | ............... | B60N 2/067 248/429 |
| 8,328,155 B2* | 12/2012 | Kostin | ............... | B60N 2/0232 248/429 |
| 8,382,058 B2* | 2/2013 | Sovis | ............... | B60N 2/0232 248/424 |
| 8,540,203 B2* | 9/2013 | Ruess | ............... | B60N 2/067 248/421 |
| 8,939,424 B2* | 1/2015 | Fukuda | ............... | B60N 2/0705 248/424 |
| 2007/0152485 A1* | 7/2007 | Ehrhardt | ............... | B60N 2/067 297/344.1 |
| 2008/0309137 A1* | 12/2008 | Kostin | ............... | B60N 2/0232 297/344.1 |
| 2009/0272869 A1* | 11/2009 | Beneker | ............... | B60N 2/067 248/429 |
| 2010/0013285 A1* | 1/2010 | Stanz | ............... | B60N 2/0232 297/344.13 |
| 2010/0213341 A1* | 8/2010 | Beneker | ............... | B60N 2/1615 248/419 |
| 2010/0320352 A1* | 12/2010 | Weber | ............... | B60N 2/067 248/429 |
| 2012/0153696 A1* | 6/2012 | Garotte | ............... | B60N 2/0881 297/344.1 |
| 2013/0015313 A1* | 1/2013 | Schmid | ............... | B60N 2/067 248/429 |
| 2013/0206928 A1* | 8/2013 | Murakoshi | ............... | B60R 16/0215 248/73 |

FOREIGN PATENT DOCUMENTS

| | | |
|---|---|---|
| DE | 603 16 483 T2 | 7/2008 |
| DE | 10 2007 027 322 A1 | 12/2008 |
| DE | 10 2007 027 409 A1 | 1/2009 |
| DE | 10 2009 004 365 A1 | 7/2009 |
| FR | 2 928 880 A1 | 9/2009 |
| JP | 61-161354 | 10/1986 |
| JP | 62-266212 | 11/1987 |
| JP | 63-150106 | 10/1988 |
| JP | 63-182313 | 11/1988 |
| JP | 08-072595 | 3/1996 |
| JP | 08-121430 | 5/1996 |
| JP | 08-216745 H | 8/1996 |
| JP | 2001-225690 A | 8/2001 |
| WO | WO-99/15803 A1 | 4/1999 |

OTHER PUBLICATIONS

Office Action dated Jul. 3, 2015, in corresponding Chinese application No. 201280036390.7, 7 pages.
International Search Report mailed Oct. 15, 2012, as received in corresponding International Patent Application No. PCT/EP2012/063150.
Office Action dated Feb. 3, 2015, in corresponding Japanese application No. 2014-520595, 3 pages.
Office Action dated Mar. 23, 2015, in corresponding Korean application No. 10-2014-7004273 and English translation, 17 pages.

* cited by examiner

HOLDING DEVICE FOR AN ADJUSTMENT DRIVE OF A MOTOR VEHICLE SEAT

CROSS REFERENCE TO RELATED APPLICATIONS

The present application is a U.S. National Stage of International Application No. PCT/EP2012/063150, filed Jul. 5, 2012, which claims the benefit of German Patent Application No. 10 2011 052 058.9, filed Jul. 22, 2011, the entire disclosures of all of which are incorporated herein by reference.

The invention relates to a holding device for an adjustment drive of a motor vehicle seat, having:
- at least one connection flange formed from a plastic material for fastening the holding device to the vehicle seat.

Holding devices of the initially-cited type are used on motor vehicle seats in order e.g. to arrange drive units, generally electric motors, or drive shafts connected to the drive units, on the motor vehicle seat where they are connected to an adjusting device of the motor vehicle seat, by means of which the motor vehicle seat can be adapted to the needs of the user. Typical adjustment drives are e.g. seat backrest adjusters, seat inclination adjusters or a seat length adjusting device, wherein the vehicle seat can be positioned by means of the latter relative to the vehicle floor in the longitudinal direction of the vehicle.

Generic holding devices are generally designed so that they can be arranged in conformance with the design requirements on the components of the motor vehicle seat. When the holding devices are used to mount a drive unit to adjust the seat length, they are for example connected to an upper rail of a motor vehicle seat and thereby allow the position of the drive unit and/or the drive shaft to be secured so that it is reliably connected to the adjustment device.

To ensure that the position of the holding devices is reliably secured, they generally have a connection flange that is normally provided with holes for fastening to the motor vehicle seat that serve to receive fastening screws or rivets by means of which a screwed connection of the holding device is possible. A disadvantage of correspondingly attaching the holding device is that, in the context of the installation process, it is work-intensive due to the sometimes poor accessibility and, in addition, the screws cause an increase in weight.

The object of the invention is to provide a holding device of the initially-cited type that can be easily and reliably arranged on a motor vehicle seat.

The object of the invention is achieved by a holding device having the features of claim 1. Advantageous further developments of the invention are specified in the dependent claims.

It is characteristic of the holding device according to the invention that on the connection flange:
- a fastening clip having at least one adjustable retaining stud, which can be adjusted between the locking position and an installed position in an elastic manner, is formed on one side, and
- a locking element is removably formed in a rest position on the other side, wherein the locking element can be manually relocated through an opening in the connection flange from the rest position into a locking position in which the locking element blocks an elastic relocation of the retaining stud into the assembly position.

According to the invention, the connection flange which, in the installed position, generally lies flat on the component to which the holding device is to be fastened, is formed from a plastic material that makes it possible to also form on the stopping flange a fastening clip that is adapted to a fastening opening in the component to be connected. As usual, the fastening clip has at least one elastically relocatable retaining stud. This does not possess any elastic displacement in the rest position, i.e., when the holding device is not installed, as well as normally in the locking position that the fastening clip assumes when the holding device is installed and the fastening clip is completely inserted into an opening in the motor vehicle seat component. In the assembly position i.e., while the fastening clip is shoved into the opening in the motor vehicle seat component, the retaining stud is elastically shoved into a position that it has when the fastening clip is inserted into the associated opening. In the installed position, the fastening clip is in the locking position and lies within the opening relaxed or slightly elastically deformed relative to the assembly position.

In addition to the fastening clip, the locking element is also formed on the connection flange on the side opposite the fastening clip before the holding device is initially installed. According to the invention, the connection is designed so that it can be released by manually actuating the locking element so that the locking element can be easily displaced through the opening in the connection flange into a locking position. In the locking position, an elastic relocation of the fastening clip which would be necessary to remove the fastening clip is blocked so that the holding device is reliably secured in its installed position.

Forming the locking element as a single piece during the manufacturing process for the holding device ensures that the locking element remains on the holding device until it is initially installed and hence cannot be lost. Only after the holding device is positioned on the motor vehicle seat component—which is associated with the arrangement of fastening clip in the associated opening in the motor vehicle seat component—is the locking element manually relocated through an opening in the connection flange from the rest position to a locking position in which the locking element blocks an elastic relocation of the retaining stud into the assembly position. Manual relocation occurs by e.g. pressing—with or without a hand tool—the locking element into the opening in the connection flange.

The locking element in the locking position thereby secures the location established by the fastening clip of the holding device on the motor vehicle seat. It is impossible to remove the holding device by simply relocating the retaining stud. The locking element would first have to be removed which is why the embodiment according to the invention accordingly enables a particularly reliable arrangement of the holding device on the motor vehicle seat. At the same time, the arrangement of the locking element which is releasable by manual actuation allows the holding device to be easily installed, wherein manual actuation is understood to be pressing in the locking element both with a finger e.g. thumb, or a manual actuation tool.

The embodiment of the fastening clip, especially its at least one retaining stud, is freely selectable in principle. According to one especially advantageous embodiment of the invention, the retaining stud has a holding surface that extends from the longitudinal axis of the fastening clip in the region of its free end opposite the connection flange. The holding surface is preferably designed so that, when the fastening clip is in the locking position, it lies against a surface that preferably runs perpendicular to the direction of insertion of the fastening clip in the motor vehicle seat component, and thereby connects the fastening clip in locking position in its axial direction in a form fit with the motor vehicle seat component. In locking position, the holding surface grips behind e.g. the peripheral edge region of an opening through which the fastening clip extends in the locking position.

According to one particularly advantageous embodiment of the invention, the retaining stud further has a shape which narrows from the holding surface toward the free end. A corresponding embodiment such as a mushroom-shaped structure of the head makes it easier and hence more economical to install the holding device on the motor vehicle seat.

According to another embodiment of the invention, the freely designable fastening clip has, as mentioned, at least two, preferably at least three, especially preferably four retaining studs arranged offset by approximately 90° that jointly have a circular inner and outer cross-section. According to this embodiment of the invention, the fastening clip preferably has four elastically relocatable retaining studs that can be elastically relocated out of the locking position into the assembly position. The use of in particular four retaining studs ensures that the position of the fastening clip is very reliably secured in the provided location hole in the motor vehicle seat component.

The preferably provided circular design of the outer cross-section also makes it possible to easily create an opening corresponding to the fastening clip by means of a corresponding hole in the motor vehicle component provided for installation. The preferably circular inner cross-section furthermore enables a suitable locking element to be easily designed that, in a particularly advantageous manner, is provided with a corresponding cross-section and hence reliably locks the retaining stud in the locking position. In case a circular inner cross-section is used, the locking element can be provided with a correspondingly circular cross-section so that the opening to be provided in the connection flange for pushing through the locking element can also be easily formed as a circle.

It is particularly preferable according to another embodiment of the invention for the retaining studs to be arranged adjacent with and run coaxial to the opening extending through the connection flange. When in the locking position, the locking element extending through the opening can to be arranged to lie directly against the inner sides of the retaining studs which generates a particularly reliable lock of the retaining studs.

As already explained above, the design of the locking element is freely selectable in principle as long as it is guaranteed that the locking element can be formed on so that it is manually releasable with the holding device and can be pushed through the opening into the locking position in which the fastening clip is blocked. According to one particularly advantageous embodiment of the invention, the locking element is formed by a locking pin with a pin body and a pin head, wherein the free end of the pin body opposite the pin head, when in rest position, is coaxially connected to the connection flange by means of a manually destructible plastic bar running coaxial to the opening, wherein the cross-section of the pin body is designed such that it can be shoved through the opening.

According to this embodiment, the locking pin is arranged coaxial to the opening in the connection flange and, after the plastic bar is disconnected, can be relocated into the locking position by a purely axial shift. The locking pin has a pin body that at its end opposite the pin head is connected by means of a preferably peripheral plastic bar to the connection flange. The dimensions of the plastic bar are configured so that it can be broken by a manual exertion of force so that the locking pin can then be relocated into its locking position. The plastic bar provided for connection between the locking pin and the connection flange therefore makes it possible to create the locking pin with the holding device already during the plastic forming process of the holding device. The arrangement with the plastic bar running coaxial to the opening makes it possible to relocate the locking pin out of its rest position into the locking position at the same time as a relocation toward the opening which causes a disconnection so that no additional actuation steps are necessary. Overall, this embodiment of the invention accordingly allows the holding device to be very easily and reliably assembled, wherein the locking pin can be easily relocated out of its rest position into a locking position that blocks the fastening clip. In a corresponding embodiment, the pin head also allows an easy manual application of force such that actuation tools for increasing the actuation force can be dispensed with.

According to another embodiment of the invention, the pin body has an expanded cross-section in the region of the pin head. In an especially advantageous manner, the cross-sectional expansion is adapted to the opening in the connection flange and has a slightly larger cross-section. This makes it possible to easily fix the location of the locking pin in its locking position in which the locking pin is held clamped in the opening by means of the cross-sectional expansion.

According to an advantageous further embodiment of the invention, the connection flange has positioning pins on its stop surface facing the motor vehicle seat components. These positioning pins make it easier to secure the position and alignment of the holding device on the motor vehicle seat component and additionally secure the position of the holding device in a crash. The cross-section of the positioning pins contributes in addition to the cross-section of the fastening clips and locking elements.

As already mentioned at the onset, the holding device can in principle be designed as desired. According to one particularly advantageous embodiment of the invention, the holding device is, however, characterized by a seat section for bearing a drive unit and/or at least one channel for bearing a drive shaft. In a corresponding embodiment, especially with an optional combined arrangement both of the drive shafts and the drive unit, additional components for securing their position can be dispensed with. In a particularly advantageous manner, the seat section, the connection flange, the fastening clip and/or the locking pin are made of a fiberglass-reinforced and/or fiber-reinforced, especially carbon-fiber-reinforced plastic that makes it possible to economically form the holding device and its components with a low weight and simultaneously high strength.

In a particularly advantageous manner, it is provided that the holding device has two channels which connect on opposite sides of a seat section and each receive one drive shaft, wherein each of the ends of the channels opposite the seat section has one connection flange.

Figure 2:
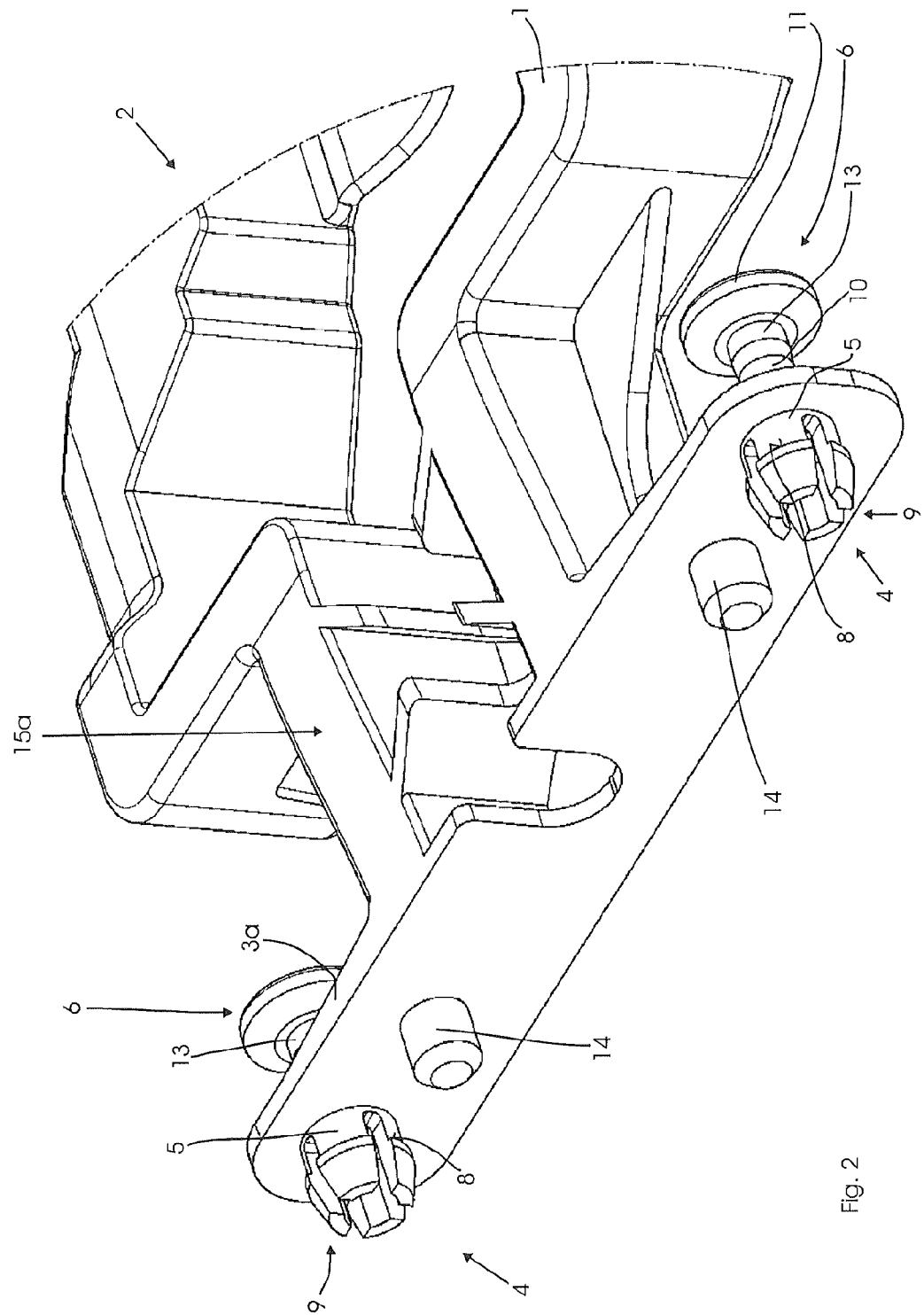
Figure 3:
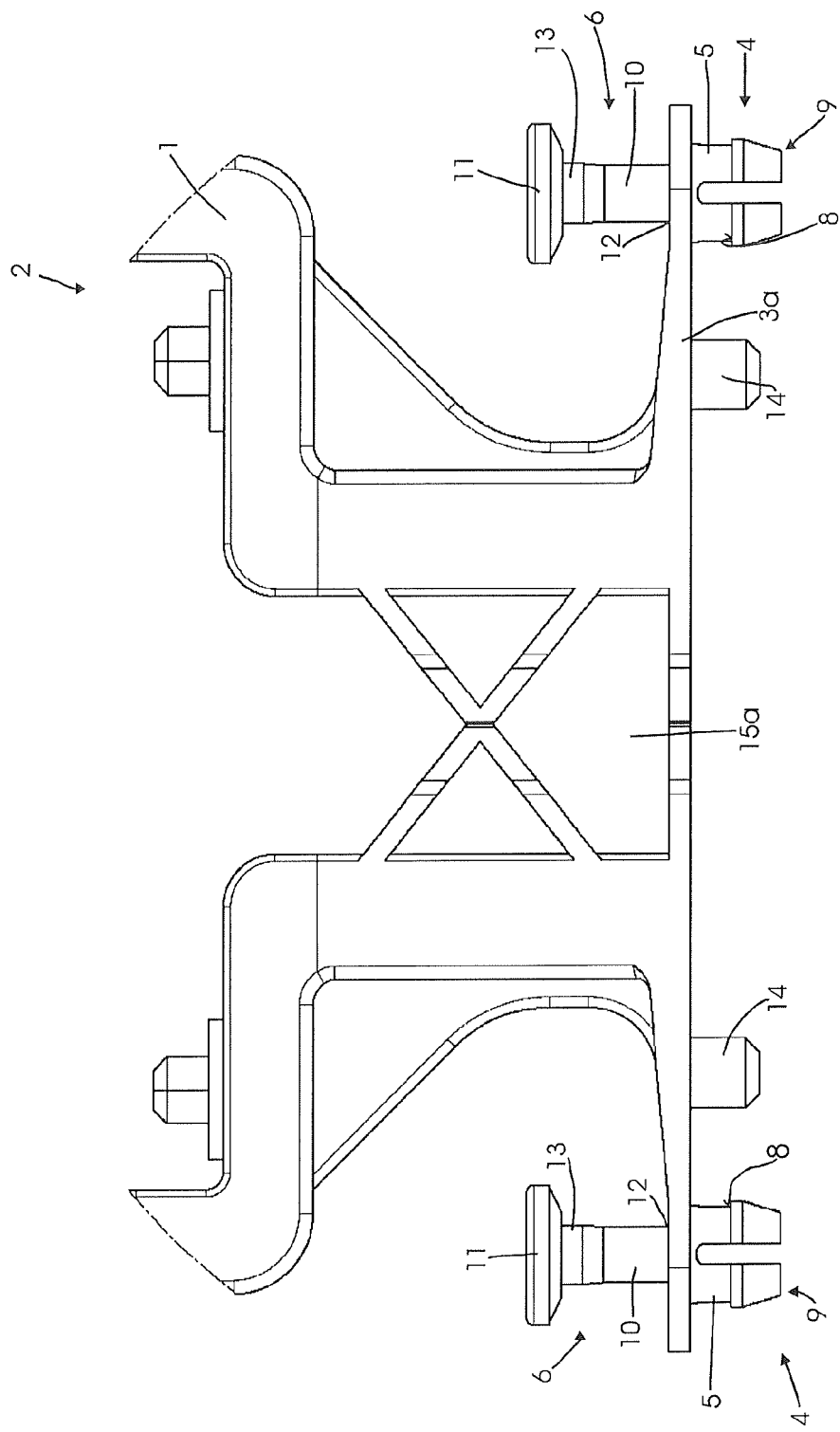
Figure 3A:
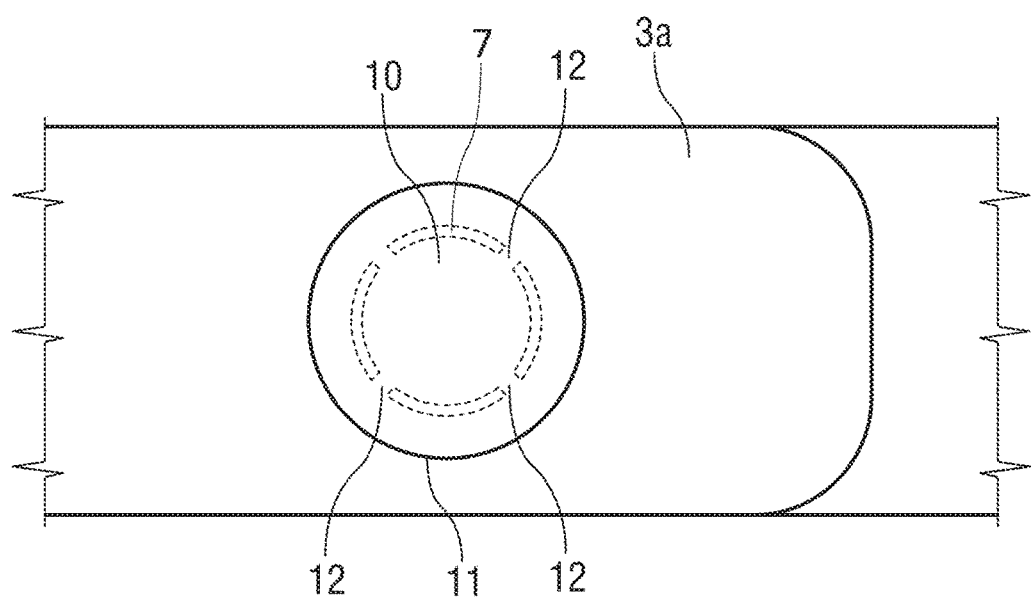
Figure 4:
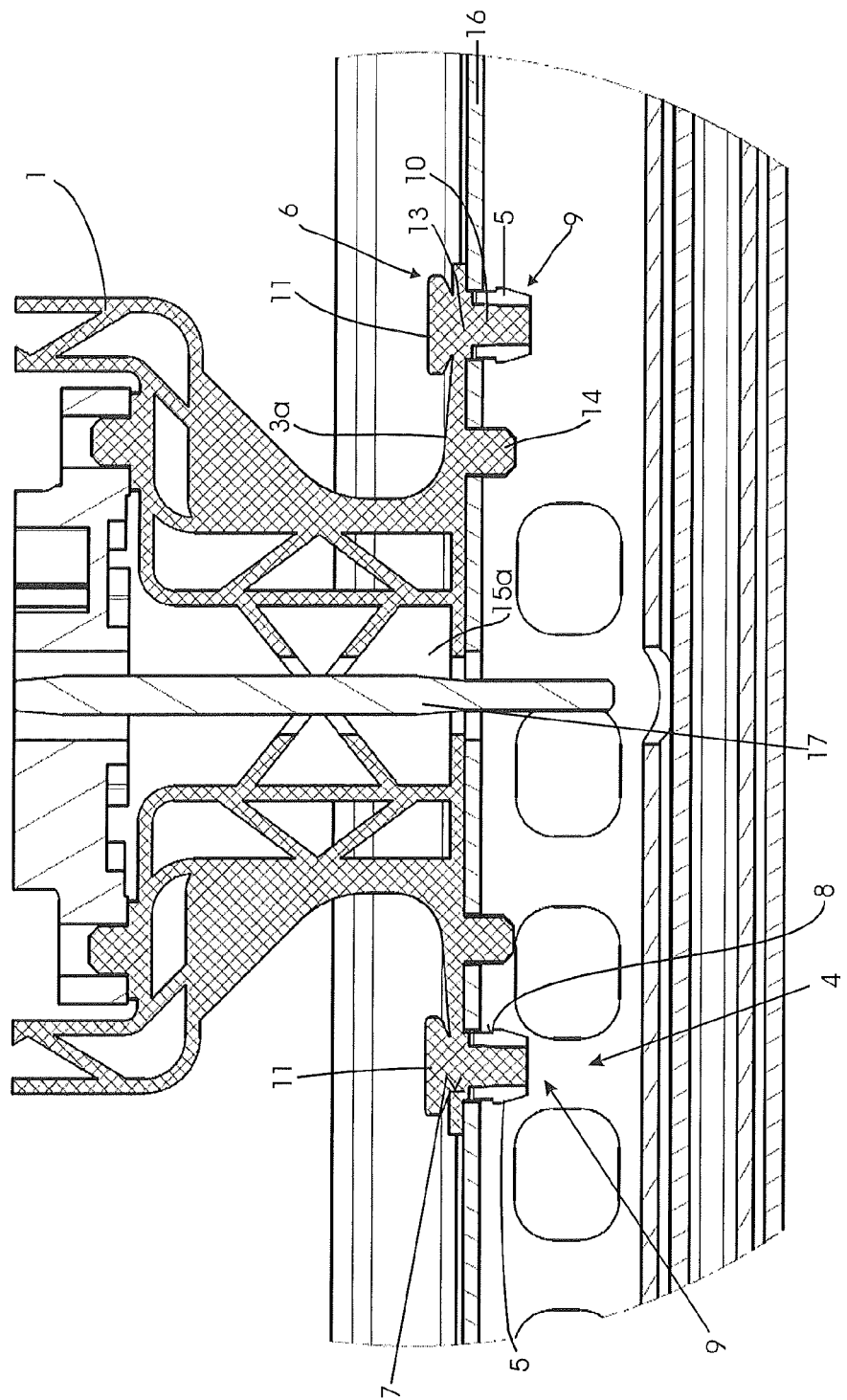
Figure 5:
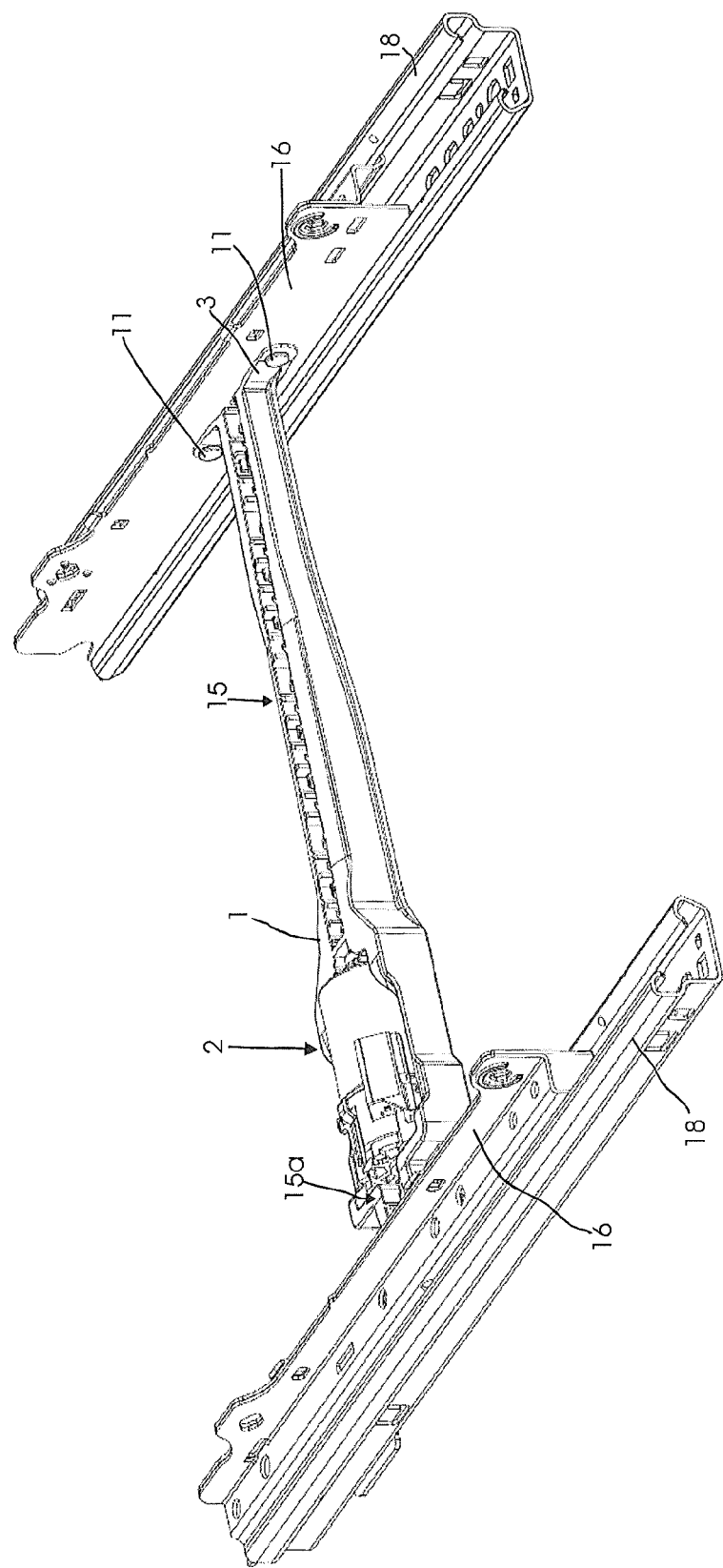

An exemplary embodiment of the invention is explained in the following in more detail with reference to the drawings. The drawings show:

FIG. 1 a perspective view of a holding device;

FIG. 2 a perspective view of an enlargement of an end of the holding device from FIG. 1;

FIG. 3 a plan view of the enlarged section shown in FIG. 2; FIG. 3A is a top view of a section of FIG. 3 showing the connection flange with the locking pin in the rest position;

FIG. 4 a sectional view of the section of the holding device from FIG. 1 shown in FIG. 3 in its assembly position on a motor vehicle seat rail, and FIG. 5 a perspective view of the holding device from FIG. 1 in the assembly position on two oppositely arranged motor vehicle seat rails.

FIG. 1 shows a perspective view of a holding device 1 that is made of a fiberglass-reinforced plastic. The holding device has a seat section 2 for arranging an electric motor, as well as two channels 15, 15a that connect to the seat section 2 and are for receiving and securing the position of a first drive shaft 17 as well as a second drive shaft (not shown). A connection flange 3, 3a running perpendicular to the longitudinal axis of the channels connects to each end of the channels 15, 15a, wherein the connection flanges 3, 3a in the installed position of the holding device 1 shown in FIGS. 4 and 5 are arranged on a bottom seat frame with their outer sides on the inner sides of seat top rails 16 that are adjustable relative to the bottom rails 18 arrangeable on the vehicle floor.

To secure the position of the holding device 1 on the top rails 16, the holding device 1 has two fastening clips 4 arranged at a distance from each other on the outer sides of the connection flanges 3, 3a, as well as two positioning pins 14 arranged at a distance from each other between the fastening clips 4. The fastening clips 4 each have four retaining studs 5 that are offset 90° from each other and have an arced cross section so that they jointly form a circular outer cross-section and inner cross-section of the fastening clip 4. The fastening clips 4 and the positioning pins 14 are inserted in openings in the seat top rail 16 when the holding device 1 is in the installed position. The diameter of the openings for the fastening clips 4 in the seat rail 16 is dimensioned so that the free, mushroom-shaped ends have a greater diameter. In order to arrange the holding device 1 on the seat top rails 16, an elastic relocation of the retaining studs 5 from their unloaded rest position into an assembly position is therefore necessary in which the retaining studs 5 are adjusted toward the longitudinal axis of the fastening clip 4.

Given the mushroom-shaped design of the free end 9 of the fastening clips 4, the locking pin 6 has in the region of its free end 9 an annular peripheral holding surface 8 with an outer diameter that is larger than the inner diameter of the opening in the seat rail 16. After the complete insertion of the fastening clips 4, the retaining studs 5 are arranged in a locking position, corresponding to the rest position, in which the free ends of the fastening clips 4 provided with holding surfaces 8 abut, or are directly adjacent to, a side of the seat top rail 16 opposite the connection flange. A fastening clip 4 therefore can only be pulled out of the opening in the seat rail 16 when the retaining studs 5 are relocated toward the mid-axis of the fastening clip.

To prevent such a relocation, a locking pin 6 is respectively arranged on the side of the connection flanges 3, 3a opposite the fastening clip 4. In the unassembled position, the locking pin 6 is connected by means of a thin plastic bar 12 to the connection flange 3, 3a (as shown in FIGS. 3 and 3A), wherein the plastic bar 12 runs coaxial to an opening 7 in the connection flange 3, 3a that has an inner diameter which is slightly larger than the outer diameter of the pin body 10 of the locking pin 6.

In the assembly position shown in FIGS. 4 and 5, the connection by means of the plastic bar 12 is interrupted by manually pressing on the pin head 11, and the locking pin 6 is shoved through the opening 7 when the holding device 1 is in the installed position shown in FIGS. 4 and 5, wherein the outer surfaces of the pin body 10 lie against the inner surfaces of the retaining studs 5 which are hence relocated via a radial relocation toward an assembly position in which the fastening clip 4 would be removable from the opening in the holding rail 16. A cross-sectional expansion 13 of the pin body 10 in the region of the pin head 11 guarantees that the locking pin 6 is friction locked in its locking position and therefore secures in a particularly reliable manner the holding device 1 in its installed position on the seat top rail 16.

The invention claimed is:

1. A holding device for a seat length adjustment drive of a motor vehicle seat, comprising:
    at least one connection flange formed from a plastic material for fastening the holding device to an upper rail of the motor vehicle seat,
    wherein the upper rail is configured to be adjusted along a seat length relative to a bottom rail of the motor vehicle seat,
    wherein the bottom rail is fixed on a vehicle floor,
    wherein the connection flange is positioned on the upper rail,
    wherein the connection flange includes an extension, a fastening clip, and a locking element,
    wherein the fastening clip has at least one adjustable retaining stud, which can be adjusted between a stud locking position and a stud assembly position in an elastic manner, and is formed on one side of the extension of the connection flange,
    wherein the locking element is movable from a locking element rest position to a locking element locking position,
    wherein the locking element is removably formed in the locking element rest position on an other side of the extension of the connection flange,
    wherein, when the locking element is in the locking element rest position, the locking element is connected to the connection flange by a bridge such that the locking element is arranged coaxial to an opening in the connection flange, and
    wherein the locking element can be manually relocated through the opening in the connection flange from the locking element rest position into the locking element locking position in which the locking element blocks an elastic relocation of the retaining stud into the stud assembly position.

2. The holding device according to claim 1, wherein the retaining stud has a holding surface positioned along an outer surface of the retaining stud in a region of its free end opposite the connection flange.

3. The holding device according to claim 2, wherein the retaining stud has a shape which narrows from the holding surface toward the free end.

4. The holding device according to claim 1, wherein the fastening clip has at least two retaining studs arranged offset by approximately 90°, and that jointly have a circular inner cross-section and/or outer cross-section.

5. The holding device according to claim 1, wherein the at least one adjustable retaining stud is arranged adjacent with and coaxial to the opening.

6. The holding device according to claim 1, wherein the locking element is formed by a locking pin with a pin body and a pin head, wherein a free end of the pin body opposite the pin head, when in the locking element rest position, is coaxially connected to the connection flange by a manually destructible plastic bar running coaxial to the opening, wherein a cross-section of the pin body is designed such that it can be shoved through the opening.

7. The holding device according to claim 6, wherein a cross-section of the pin body in a region close to the pin head is larger than a cross-section of the pin body in a region further from the pin head.

8. The holding device according to claim 1, wherein the connection flange has positioning pins arranged adjacent to the fastening clip.

9. The holding device according to claim 1, having a seat section for bearing a drive unit, and/or at least one channel for bearing a drive shaft.

10. The holding device according to claim 9, wherein the seat section, the connection flange, the fastening clip and/or the locking pin are made of a fiberglass-reinforced and/or fiber-reinforced plastic.

11. The holding device according to claim 1, having two channels which connect on opposite sides of a seat section, wherein each of the two channels are configured to receive one drive shaft, wherein each of the channels has an end that is opposite the seat section and has one connection flange.

12. The holding device according to claim 1, wherein, when the locking element is in the locking element rest position, the locking element and the extension of the connection flange are integral components.

* * * * *